Figure 1:
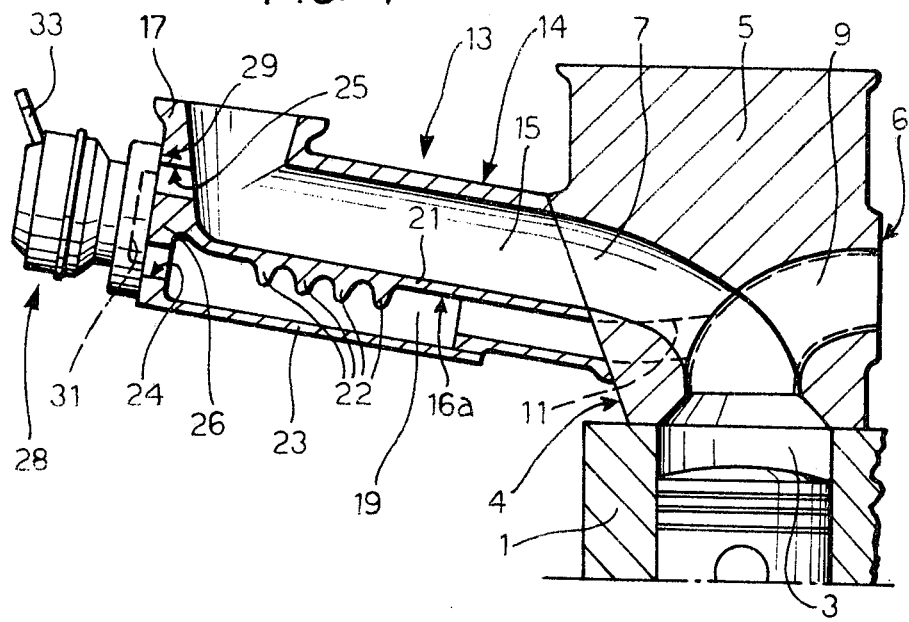

United States Patent [19]

Leoni

[11] 4,413,605
[45] Nov. 8, 1983

[54] INTAKE MANIFOLD HEATING AND EXHAUST GAS RECIRCULATION SYSTEM FOR AN INTERNAL COMBUSTION ENGINE

[75] Inventor: Aldo Leoni, Cavoretto, Italy

[73] Assignee: Flat Auto S.p.A., Turin, Italy

[21] Appl. No.: 295,973

[22] Filed: Aug. 25, 1981

[30] Foreign Application Priority Data

Sep. 12, 1980 [IT] Italy .............................. 53504/80[U]

[51] Int. Cl.³ ...................... F02M 31/00; F02B 47/08
[52] U.S. Cl. .................................. 123/547; 123/548; 123/568
[58] Field of Search ...................... 123/548, 547, 568; 261/144, 145

[56] References Cited

U.S. PATENT DOCUMENTS

| | | | |
|---|---|---|---|
| 1,860,641 | 5/1932 | Woolson | 123/547 |
| 3,500,807 | 3/1970 | Daigh | 123/547 |
| 3,828,747 | 8/1974 | Nambu | 123/547 |
| 3,846,980 | 11/1974 | DePalma | 123/547 |
| 4,181,111 | 1/1980 | Sanada | 123/548 |

Primary Examiner—Ronald H. Lazarus
Attorney, Agent, or Firm—Sughrue, Mion, Zinn, Macpeak and Seas

[57] ABSTRACT

An internal combustion engine is provided with a system for heating the intake manifold and for the partial recirculation of the exhaust gas.

1 Claim, 2 Drawing Figures

U.S. Patent   Nov. 8, 1983   4,413,605

INTAKE MANIFOLD HEATING AND EXHAUST GAS RECIRCULATION SYSTEM FOR AN INTERNAL COMBUSTION ENGINE

The present invention relates to internal combustion engines and in particular to a system for heating the intake manifold of an internal combustion engine by means of the exhaust gases.

The object of the present invention is to provide a system of the aforesaid type which is simple, economical and functional in structure and furthermore is usable to achieve partial recirculation of the exhaust gases in the engine.

According to the present invention, this object is achieved by providing an internal combustion engine, comprising:

at least one cylinder, inlet and outlet ducts in communication with the said at least one cylinder, an intake manifold having a body including an intake conduit in communication with said inlet duct and a chamber located below said intake conduit and separated therefrom by an internal wall of said body, at least one auxiliary outlet conduit connecting said outlet duct to said chamber, an exhaust gas recirculation duct connecting said chamber to said intake conduit, and valve means responsive to the engine load to control the communication between said chamber and said intake conduit.

As a result of the particular structure and arrangement described above the system according to the invention allows the heating of the intake manifold and the recirculation of the exhaust gas to be achieved at the same time. This recirculation is controlled by the said valve means, which are of a type known per se, so that it takes place only if the engine load increases beyond a predetermined value corresponding to the development of temperatures in the combustion chamber which would favour the generation of nitrogen oxides. This generation will be immediately reduced by the recirculation of exhaust gas into the combustion chamber.

Figure 2:
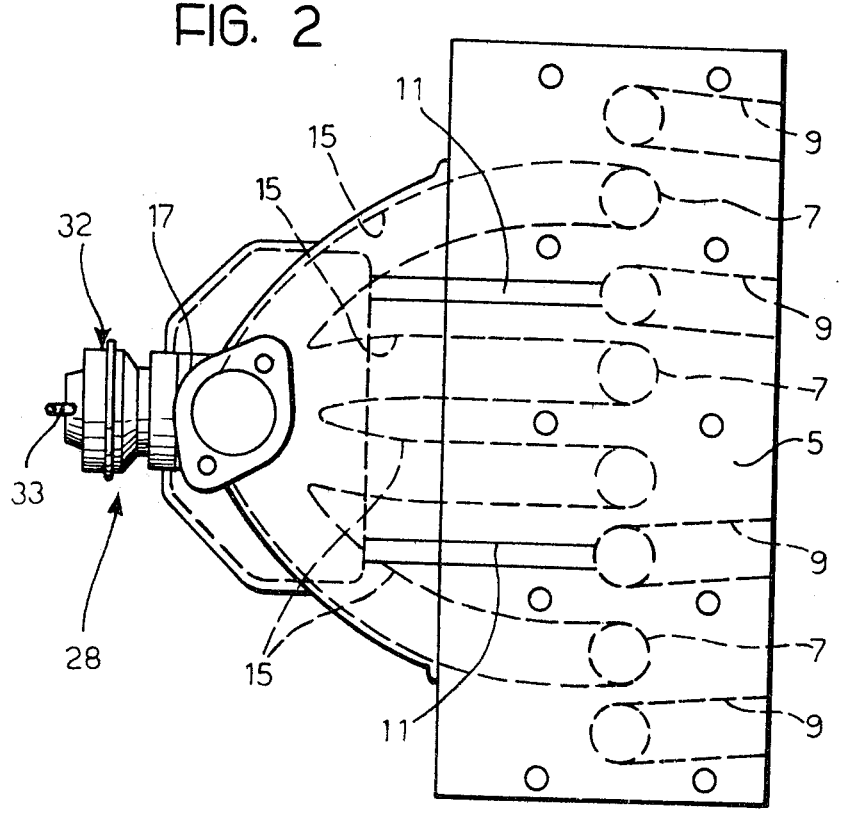

Further characteristics and advantages of this invention will emerge from the following description with reference to the accompanying drawings which are supplied purely by way of non-restrictive example, in which:

FIG. 1 is a side view, in section, of the head and of the intake manifold of an internal combustion engine according to the present invention, and FIG. 2 is a plan view of a detail of FIG. 1.

In the drawings, the block of an internal combustion engine is indicated by 1 and includes a cylinder 3 and a head 5. The head 5 is formed with an inlet ducts 7 and outlet ducts 9 which communicate with the cylinder 3 and opens into the outer surfaces 4, 6 of the head.

The head 5 is provided on the side of the surface 4 with an intake manifold 13 having a body 14 within which is defined a plurality of intake conduits 15 each having an end communicating with an inlet duct 7. The opposite ends of the intake conduits 15 open into a flange 17 of the intake manifold 13 provided for the fixing of a carburettor to the manifold.

The intake manifold 13 has a chamber 19 which is situated below the intake conduits 15 and is separated from the intake conduits 15 by a wall 21 provided on its surface 16a facing the chamber 19 with ribs 22 for increasing heat exchange. The chamber 19 communicates with the outlet duct 9 through an auxiliary outlet conduit 11 formed partly in the body 14 of the intake manifold 13 and partly in the cylinder head 5.

FIG. 2 illustrates two auxiliary outlet conduits 11 as the drawing relates to an engine with four cylinders in which the chamber 19 communicates with two of these cylinders. In this case, the two cylinders which communicate with the inner chamber 19 are preferably out of phase with each other by a crank shaft angle of 180°.

The bottom of the chamber 19 is defined by a wall 23. Two holes 24, 25 opening into the chamber 19 and and into the intake conduits 15 respectively, are formed in a wall 26 of the body 14 of the intake manifold 13. An exhaust gas recirculation valve 28 is fixed to the wall 26 of the intake manifold 13 and includes, as known per se, an exhaust gas recirculation duct 31 (illustrated schematically in FIG. 1) communicating said chamber 19 with the intake conduits 15 through the holes 24, 25. The valve 28 is further provided with shutter means interposed in the duct 31 and sensitive to a pressure signal transmitted from the carburettor through a flexible tube (not illustrated) to a tubular connector 33.

The operation of the system described above is as follows:

at low rates of rotation of the engine, part of the exhaust gas which leaves the cylinder 3 in the exhaust phase passes through the corresponding auxiliary outlet conduit 11 and enters the chamber 19; it then leaves the chamber 19 passing through the other auxiliary outlet conduit 11 which opens therein and finally returns into the corresponding outlet duct. Bearing in mind the low rate of rotation of the engine, the direction of flow of these exhaust gases is continually reversed between the two auxiliary outlet conduits 11; in this manner effective heating of the wall 21 of the intake manifold 13 by the waste gases flowing into the chamber 19 is achieved. At other rates of rotation of the engine, given the inertia of the exhaust gas in the aforesaid conduits, this alternate flow is annulled. The heating action of the stagnant exhaust gas in the inner chamber 19 thus becomes rather less intense.

With regard to the recirculation of the exhaust gases, the valve 28 is calibrated (in a manner known per se) to open for engine loads greater than a predetermined value. In fact the emission of nitrogen oxides from the engine increases with increasing engine load, and may be contained by the admission of exhaust gases into the intake conduits 15. Hence, when the engine load surpasses the said predetermined value, the valve 28, by opening, allows the recirculation of part of the exhaust gases from the inner chamber 19 into the intake conduits 15 through the exhaust gas recirculation duct 31. The operation of the valve 28 is however subject (in a manner known per se) to the overriding control of a thermovalve (not illustrated) which detects the temperature of the water in the engine; for water temperatures in the engine less than a predetermined value the thermovalve prevents the opening of the valve 28.

I claim:

1. An internal combustion engine including an engine block defining a plurality of in-line cylinders each having an inlet and outlet duct in communication therewith, an intake manifold having a body defining a plurality of separate intake conduits in communication with said inlet ducts, said body of said intake manifold further defining a chamber located below said plurality of intake conduits, said body having an internal wall separating the chamber and said plurality of intake conduits and having a plurality of ribs on the surface of said wall facing said chamber, two auxiliary outlet conduits communicating said outlet ducts of two cylinders having an operational phase displacement of 180° with said chamber, an exhaust gas recirculation duct communicating said chamber with said intake conduits and valve means responsive to the engine load to control the communication between said chamber and said intake conduits.

* * * * *